United States Patent
Peczalski et al.

(12) 
(10) Patent No.: US 6,534,887 B1
(45) Date of Patent: Mar. 18, 2003

(54) MICROWHEEL

(75) Inventors: Andrzej Peczalski, Eden Prairie, MN (US); Daniel W. Youngner, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 77 days.

(21) Appl. No.: 09/684,224

(22) Filed: Oct. 6, 2000

(51) Int. Cl.[7] .................................................. H02K 7/09
(52) U.S. Cl. ............................. 310/90.5; 310/40 MM; 310/309
(58) Field of Search ........................ 310/90.5, 40 MM, 310/309

(56) References Cited

U.S. PATENT DOCUMENTS

| | | | | |
|---|---|---|---|---|
| 4,943,750 A | * | 7/1990 | Howe et al. | 310/309 |
| 5,177,387 A | * | 1/1993 | McMichael et al. | 310/90.5 |
| 5,436,516 A | * | 7/1995 | Yamazaki et al. | 310/90.5 |
| 5,646,464 A | | 7/1997 | Sickafus | |
| 5,726,512 A | * | 3/1998 | Chu et al. | 310/90.5 |
| 5,874,798 A | | 2/1999 | Wiegele et al. | |
| 5,932,940 A | | 8/1999 | Epstein et al. | |
| 6,114,788 A | * | 9/2000 | Vuillemin et al. | 310/90.5 |
| 6,122,993 A | | 9/2000 | Morris et al. | |
| 6,211,589 B1 | * | 4/2001 | Ahlstrom et al. | 310/74 |
| 6,304,015 B1 | * | 10/2001 | Filatov et al. | 310/90.5 |

FOREIGN PATENT DOCUMENTS

EP  0922636 A  6/1999

OTHER PUBLICATIONS

The Development, Demonstration and Integration of Advanced Technologies to Improve the Life Cycle Costs of Space Systems, Aerospace Applications Conference, 1996. Proceedings., 1996 IEEE Aspen, CO., USA 3–10–Feb. 1996, New York, NY, USA, IEEE, US Feb. 3, 1996 pp. 217–225, XP010159001, ISBN: 0–7803–3196–6, p. 219 p. 220.

Drigna M D et al: Electromagnetically Levitated Flywheel Energy Storage System with Very Low Internatl Impedance: Pulsed Power Conference, 1997, Digest of Technical Papers, 1997 11th IEEE International Baltimore, MA, USA Jun. 29–Jul. 2, 1997, New York, NY, USA, IEEE, US Jun. 29, 1997, pp. 1560–1565, XP010280007, ISBN: 0–7803–4213–5, Figure 1C.

Ayer Frnacois et al: "New Opportunities for Satellite Integrated Power and Attitude Control Systems" Proceedings of the Annual Meeting, Navigational Technology for the 3rd Millenium, XX, XX, Jun. 19, 1997, pp. 831–841, XP002096034 The Whole Document.

Sweeting, M.N. "Small Satellites for Affordable Access to Space" Proceedings of Euro–Asia Space Week on Cooperation in Space, p. 393, Nov. 23–27, 1998, Singapore.

Ovchinnikov, Michael "Methods to Control the Attitude Motion of a Satellite by Earth's Magnetics Usage" Proceedings of Euro–Asia Space Week on Cooperation in Space, p. 475, Nov. 23–27, 1998, Singapore.

Kelly, Chad O.; Friend, H. Dwayne; Higgins, Robert; "Li–Ion Satellite Cell Development: Past, Present, Future" Proceedings of the Thirteen Annual Battery Conference on Applications and Advances, p 335, Jan. 13–16, 1998, Long Beach, CA.

Keener, David; Reinhardt, Kitt; Mayberry, Clay; Radzykewycz, Dan; Donet, Chuck; Marvin, Dean; Hill, Carole "Direction sin US Airforce Space Power Technology for Global Virtual Presence" Conference Proceedings 420, Space Technology and Application International Forum—1998, p. 211.

* cited by examiner

Primary Examiner—Mark O. Budd
(74) Attorney, Agent, or Firm—Kris T. Fredrick

(57) ABSTRACT

A microwheel having stators constructed on a wafer material forming an evacuated. cavity in which a rotor is levitating to lessen friction losses. A plurality of microwheels can be integrated to serve as energy storage and/or momentum control devices.

7 Claims, 4 Drawing Sheets

MICROWHEEL

FIELD OF THE INVENTION

This invention relates to micromachined flywheels and/or reaction wheels, and particularly to micromachined flywheels and/or reaction wheels used for energy storage and attitude control in a lightweight space vehicle.

BACKGROUND OF THE INVENTION

Possibilities for lightweight satellites are currently being explored. It is hoped that such satellites will eventually have mass reduced by an order of magnitude as compared to conventional satellites. Lightweight satellites present a new paradigm of spacecraft that calls for performing the same missions as today's satellites, but at lower cost. For example, one goal is to have a 100 kg satellite of the future perform the same work as today's 1000 kg satellite. Another goal calls for satellites having mass of about 10 kg working in reconfigurable clusters for space surveillance and other purposes. In addition, new logistic space missions will likely include, for example, on-orbit servicing, and de-orbiting. Such new logistic missions will also need small, very agile satellites with long lifetimes.

Planned lightweight satellites are being called micro-satellites and nano-satellites. It is expected that some form of micro-satellites and nano-satellites will be developed for flight demonstration in the next two to three years. These new satellites will require stored energy for power, and attitude control devices for maintaining or changing orbits.

Attitude control devices that are expected to be available for micro-satellites and nano-satellites include gravity booms or tethers, and microthrusters. Unfortunately, gravity booms and tethers are not weight efficient. This is true even though tethers also generate power. As a further drawback, tethered satellites may de-orbit in about four months because of drag induced by the energy extraction. Most significantly, booms and tethers are not considered suitable for agile satellites that may be deployed for logistic missions. One reason that such devices are not desirable is that booms and tethers are slow when adjusting satellite position to precisely point an antenna or camera. Further, such systems are restricted to pointing in only one direction. Microthrusters can provide mobility but have limited fuel capacity.

Another important requirement for the planned micro-satellites and nano-satellites is energy storage. Energy storage on satellites requires batteries that are light, small and rechargeable over many cycles. It is expected that solar panel powered satellites will need up to about a 35,000 charge/discharge cycle capability. Batteries that meet these requirements are not available. Known rechargeable batteries, e.g., nickel hydrogen (Ni H) or lithium ion (Li Ion) batteries, cannot be recycled more than 1000 times. Moreover, such batteries require stable room temperatures for high energy capacity and long life. Temperature stabilization, in turn, requires adding temperature stabilization circuits that increases system weight and cost. The energy density of Ni H batteries at system level is 25 Whr/kg. Li Ion batteries may have an energy density number as high as 50 Whr/kg. The need for power conversion and temperature stabilization circuits lowers the energy density number significantly from the battery only power density. The microwheel used as a flywheel may achieve energy density of 50 Whr/kg and it can be recharged 100,000 times or more. It also may provide high surges of current which are not available from batteries.

It has been shown above that energy storage and attitude control requirements for lightweight satellites have not been adequately addressed by presently known systems. For both applications low cost and low losses are desirable.

SUMMARY OF THE INVENTION

The present invention provides for the first time a rotating microwheel for meeting energy storage and attitude control requirements for lightweight satellites. In order to meet these goals the present invention offers an innovative and affordable micromachined reaction/flywheel that integrates the attitude control and energy storage and electronics functions. The microwheel allows pointing with high precision, analogously to large satellites that use much larger mechanical momentum and gyroscopic wheels. The new microwheel constructed in accordance with the invention, is highly modular so it can serve micro-satellites and nano-satellites with different levels of redundancy.

One object of the invention is to provide an attitude control reduced in mass by factor of about 10 as compared to the state of the art reaction wheels to enable existing missions with lower weight and open possibilities for new missions.

It is another object of the invention to provide a micromachined wheel, or microwheel, that complements microthrusters resulting in a simpler, lighter, structure of a lightweight microsatellite that uses fuel more efficiently when the attitude is controlled by the microwheel used as a momentum transfer device.

It is another object of the invention to provide micromachined wheels that can be easily manufactured in modules of 5 Nms momentum and 40 W/hr energy capacity in order to provide attitude control, which is essential for cluster control, cheaply and at low weight for satellites having mass of about 10 kg working in reconfigurable clusters for space surveillance and other missions.

It is another object of the invention to provide a highly integrated micromachined flywheel for small, very agile satellites having long lifetimes to enable space missions such as, for example, on-orbit servicing, and de-orbiting.

It is another object of the invention to provide a highly integrated micromachined flywheel for multifunction integration in a lightweight satellite for cost, weight, and power reduction.

It is another object of the invention to provide a microwheel comprising silicon crystal material having low cost (e.g. $40/wafer) and high rupture modulus allowing high rotational speed approaching 6000 rotations per second, that is the same as the strongest carbon matrix materials.

It is another object of the invention to provide a microwheel having high precision, micromachined flatness and dimensions for small gap between wheel and package (e.g. about 10 micrometer spacing gives high levitation force and high torque with low current) and good balance.

It is another object of the invention to provide a microwheel having a magnetic levitation in an evacuated package that is integral to the fabrication process having low weight, high reliability, high efficiency, low cost. It is another object of the invention to provide a microwheel where the wheel and package are of the same material that allows for operation over a wide temperature range and used as multichip module material (MCM) for other electronics.

In summary, the micromachined mesoscopic momentum/flywheel of the invention, called the microwheel herein, can achieve about a tenfold reduction of cost and about a tenfold decrease of weight as compared to the state of the art products. Furthermore, the microwheel enables multifunction integration of altitude control, energy storage, electronic platform, and structural functions and modular and novel redundant architecture.

DETAILED DESCRIPTION OF THE INVENTION

Figure 1:
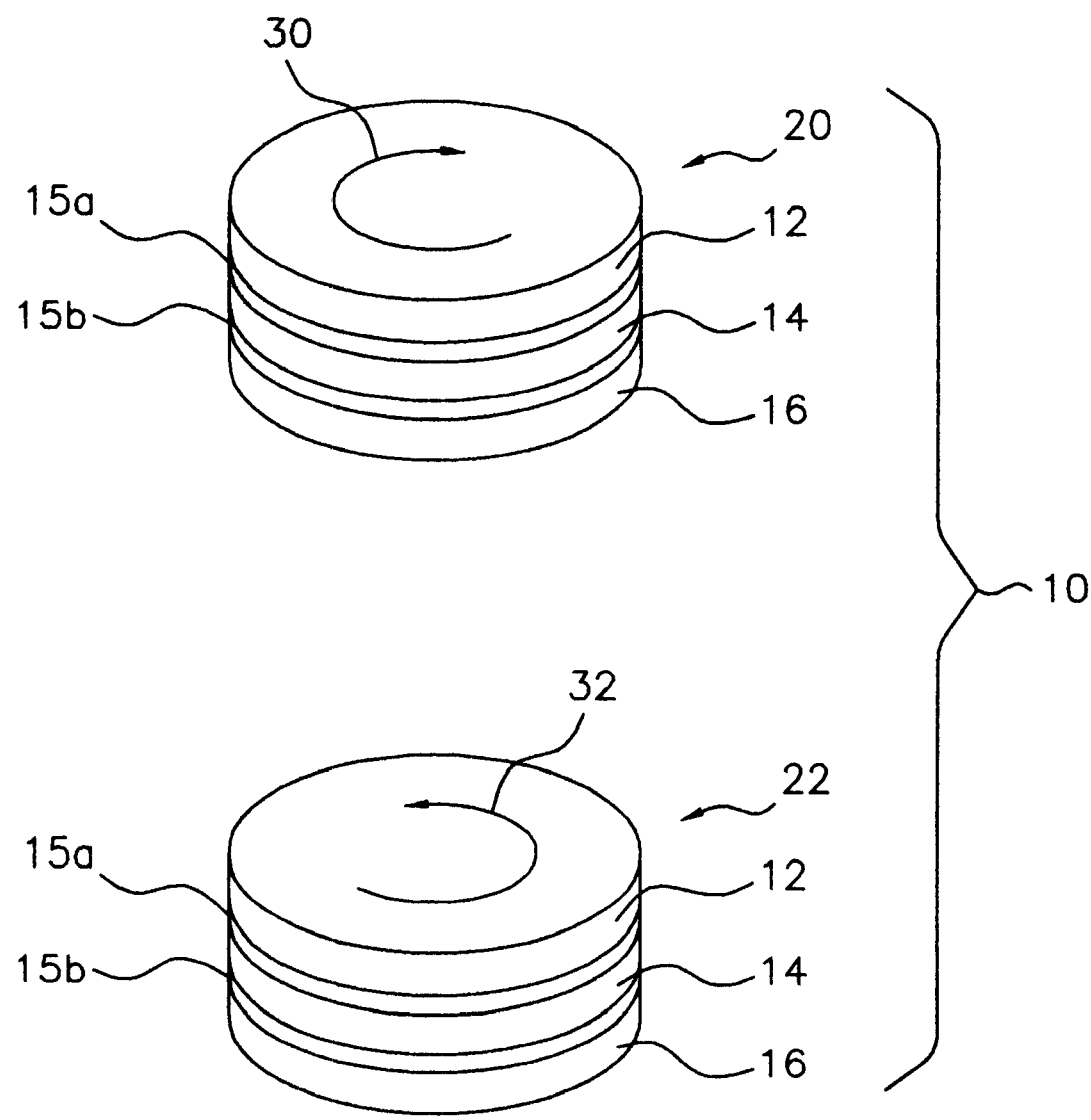
FIG. 1 schematically shows two exemplary meso-electromechanical momentum/flywheels, constructed in counter-rotating configuration in accordance with the invention.
Figure 2:
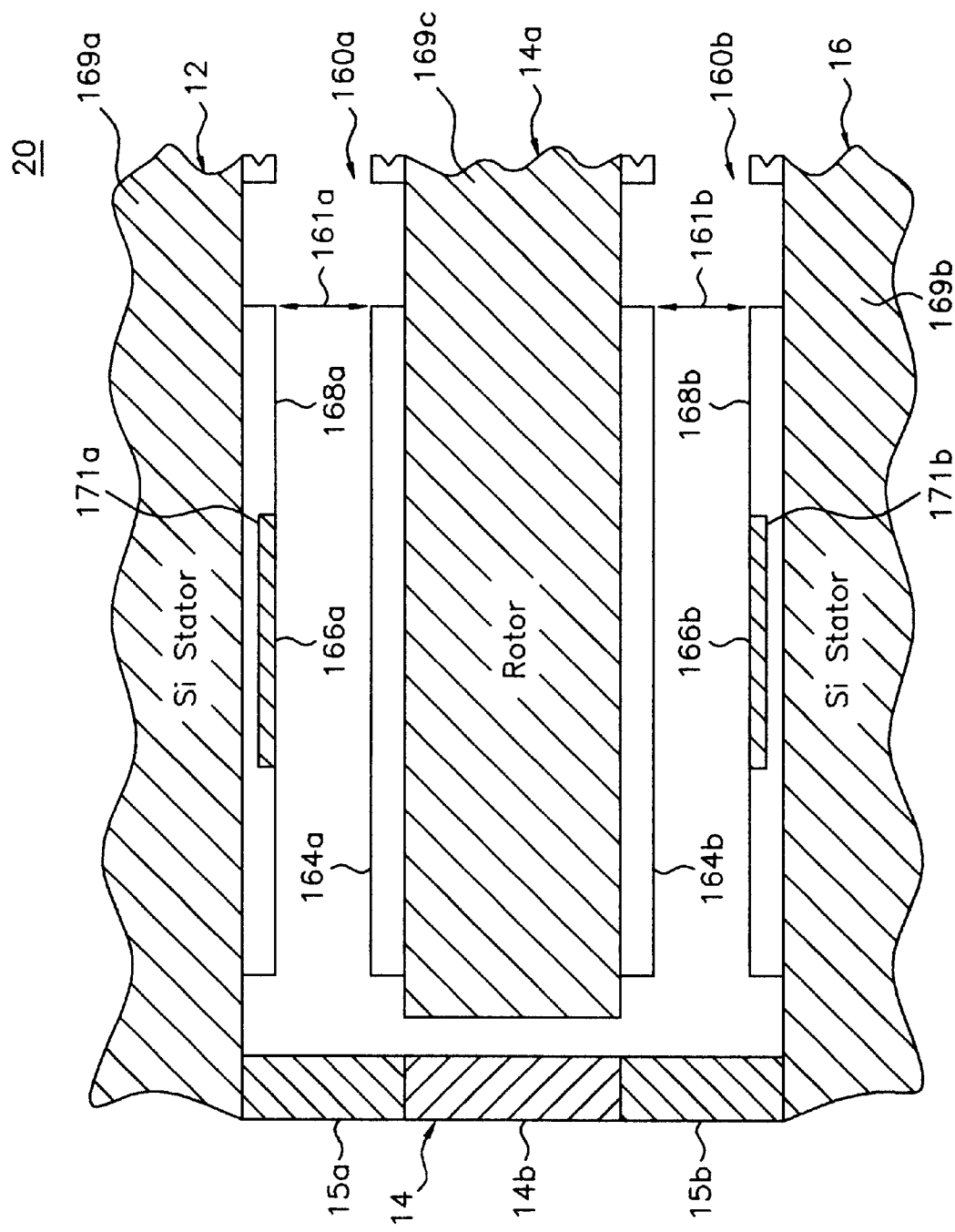
FIG. 2 schematically shows a crossectional view of an exemplary microwheel as constructed in accordance with the teachings of the present invention.
Figure 4:
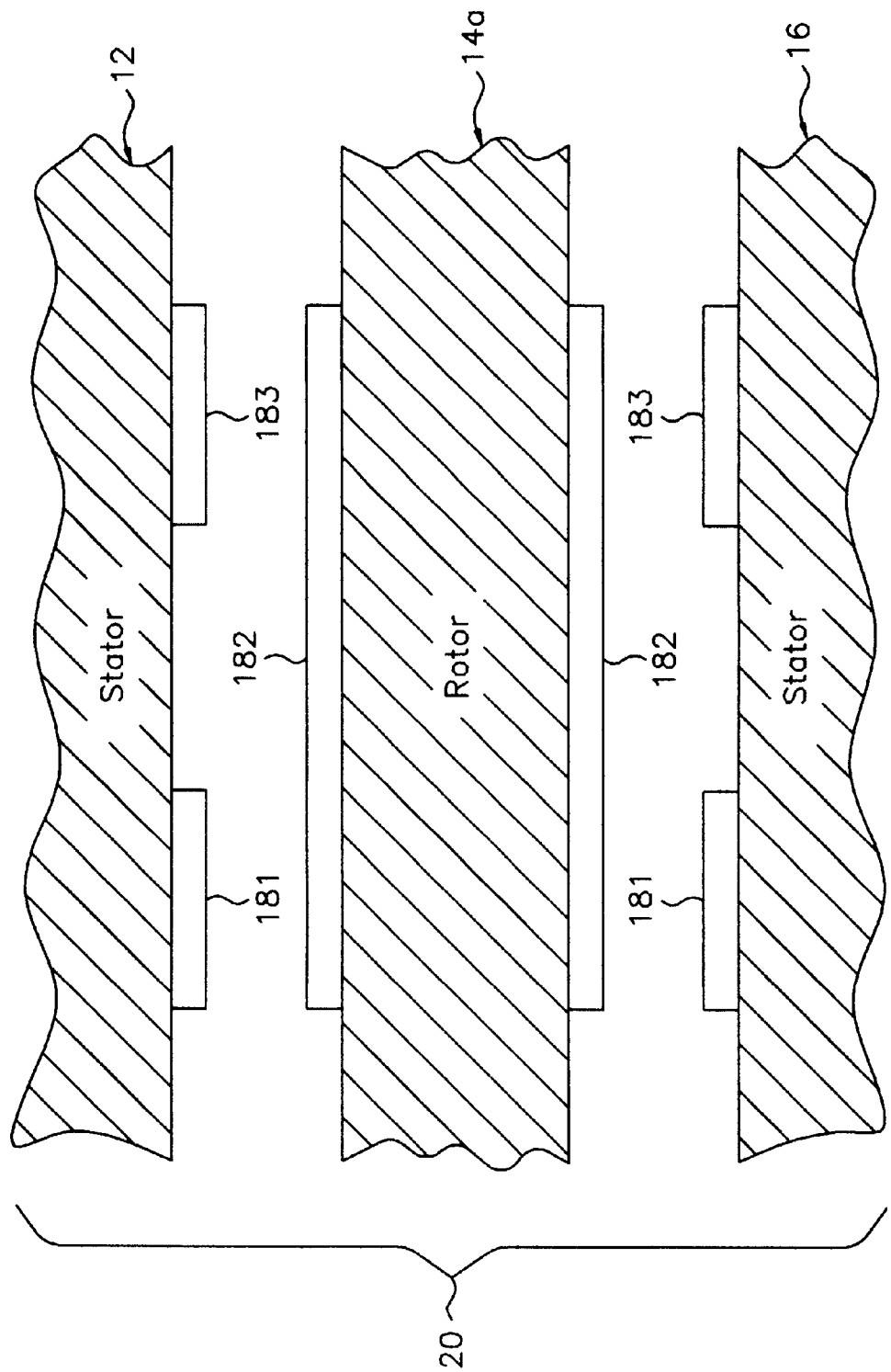
FIG. 4 schematically shows another crossectional view of an exemplary microwheel as constructed in accordance with the teachings of the present invention.

Referring now to FIG. 1, a system 10 including two exemplary meso-electromechanical momentum/flywheels constructed in counter-rotating configuration in accordance with the invention is schematically shown. The wheels may be integrated with structure of the vehicle, therefore the external package is not shown. The structure includes dual microwheels 20, 22 each having three bonded layers, a top layer 12, a bottom layer 16 and a middle layer 14, forming an evacuated cavity. A rotor (as best shown in FIGS. 2 and 4) within each middle layer 14 is cut as a precisely concentric circle of smaller diameter than the two external wheels formed by top layer 12 and bottom layer 16. The top layer 12 and bottom layer 16 function as stators. The rotor contained in middle layer 14 can rotate and magnetically levitate due to actuators on the two external layers on each microwheel 20, 22.

Two rings 15a and 15b at the perifery of the two stators form spacers between the two stators, top layer 12 and bottom layer 16. The rings 15a and 15b and two stators together form an evacuated package. In addition to functioning as stators, either or both top layer 12 or bottom layer 16 may advantageously comprise multichip module material (MCM) and serve as an electronic substrate. In one useful embodiment silicon wafers about 1 mm thick and about 1 to 8 inches (25 to 200 mm) in diameter can be used. The dual microwheels 20 and 22, with opposing spins indicated by arrows 30 and 32, allow for significant 6 mm energy storage up to 20 Whr (up to 80 Wh/kg) and angular momentum control beyond 50 Nms.

Micromachined microwheels are suitable for multifunction integration. The dual redundant array of six reaction wheels can both store energy and provide full attitude control assuming that each can be tilted in two axis by 30 to 50 degrees (J. R. Downer, "Design of Large Angle Magnetic Suspension," Ph.D. Thesis, MIT 1986). The low cost, flat form factor, and energy storage in the micromachined flywheel opens up new architectures for reaction wheels. Two wheels spinning in opposite directions may quickly transfer the energy and angular momentum between each other. The external power requirements are small. External power is only needed for control functions and internal losses. The twin microreaction wheel architectures enables achievement of much higher moments that are impossible to achieve with single wheel because of high power required for high angular frequency.

In addition, integration of electronics is possible onto the microwheel silicon package. Silicon is an excellent multichip module material (MCM) with dense, multilayer interconnects and good thermal conductivity. The integrated bus and mission electronics can be housed on the reaction/flywheel external package. The low cost and standard, large diameter of silicon wafers, for example, 6 inch, lend themselves to standard modules. Because of the standard size and flat form factor, the micromachined wheels can be integrated with satellite walls or other structural flat panels.

Referring now to FIG. 2, a crossectional view of the exemplary microwheel 20 as constructed in accordance with the teachings of the present invention is schematically shown. The microwheel 20 includes top and bottom layers 12, 16 respectively that function as stators. The middle layer 14 includes a rotor 14a and a substantially circular wall 14b, around the rotor, between the other layers. The top layer 12 includes a base 169a, preferably comprising silicon or equivalent wafer material. A magnetic layer 168a is deposited or otherwise attached to the bottom of the base 169a. The magnetic layer 168a is preferably a permalloy material or an equivalent magnetic material optionally having a recess 171a therein. Deposited within the recess 171a is a conductor 166a. If no recess is present the conductor may be directly applied to the permalloy material. The conductor 166a preferably comprises gold, copper or any other suitable conductor. The bottom layer 16 is constructed similarly to the top layer 12 and includes a base 169b, preferably comprising silicon or an equivalent wafer material. A magnetic layer 168b is deposited or otherwise attached to the bottom of the base 169b. The magnetic layer 168b is preferably a permalloy material or equivalent magnetic material optionally having a recess 171b therein. Deposited within the recess 171b is a conductor 166b. If no recess is present the conductor may be directly applied to the permalloy material. The conductor 166b prefeably comprises gold or another suitable conductor.

The rotor 14a includes a base 169c, also preferably comprising silicon or an equivalent wafer material. A first rotor magnetic layer 164a is deposited or otherwise attached to one side of the base 169c. A second rotor magnetic layer 164b is deposited or otherwise attached to the side of the base 169c opposite the first rotor magnetic layer 164a. The first magnetic layer 164a and second magnetic layer 164b are preferably a permalloy material or equivalent magnetic material.

In a preferred embodiment, the microwheel rotor 14a, is made of a single crystal silicon wafer or wafers. A microwheel rotor constructed in accordance with this invention can exhibit a rupture modulus per weight approaching the strongest materials (e.g. carbon fibers). The microwheel rotor 14a is suspended between two silicon wafers functioning as stators. In operation, a suspension force is generated by current flowing in the conductors 166a, 166b of FIG. 2. The electromagnetic field is induced in the patterned magnetic films on both sides of the rotor and both stators, namely magnetic layers 164a, 164b, 168a and 168b.

Figure 3:
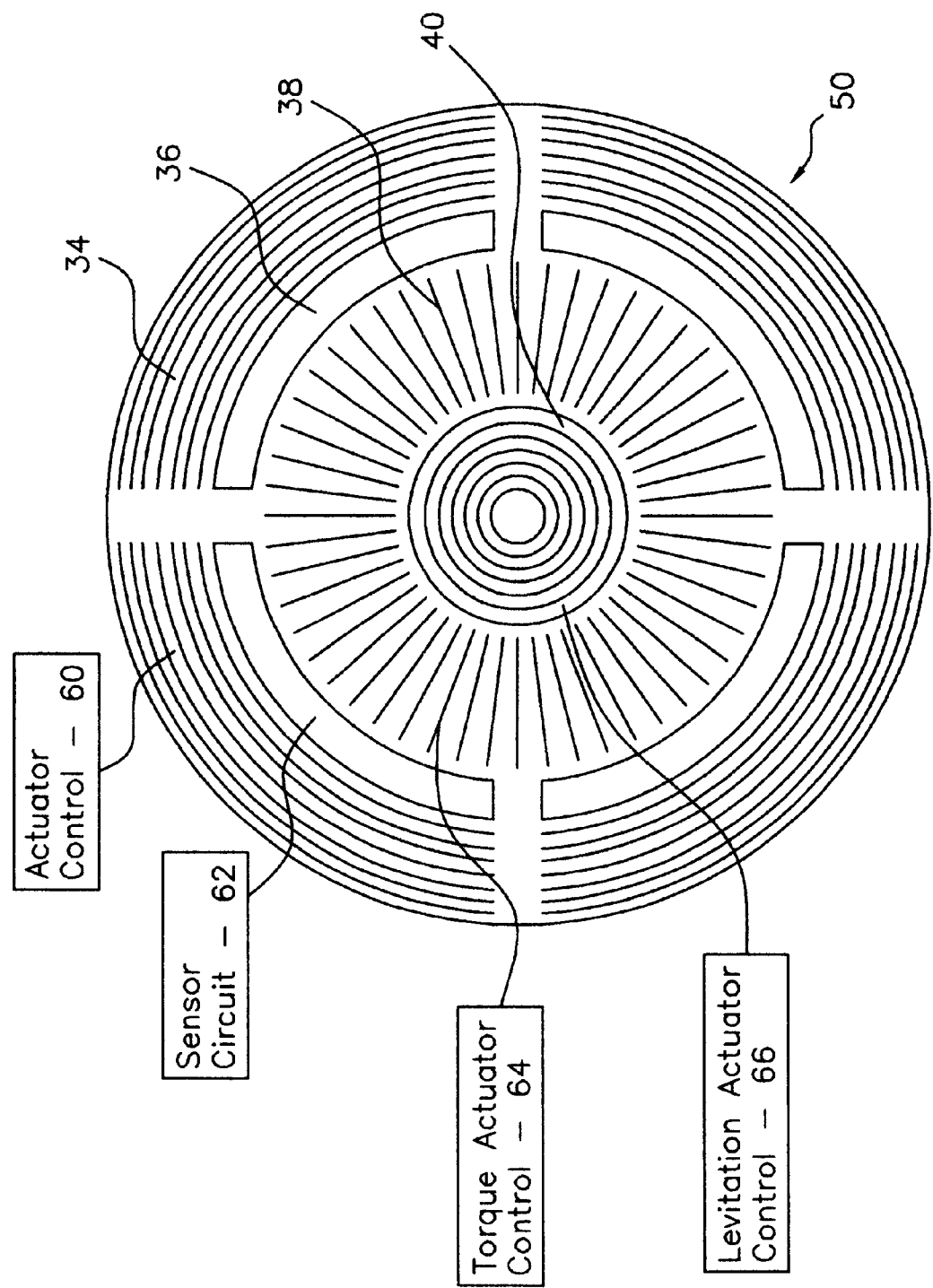
FIG. 3 schematically shows an actuation and sensing pattern as used in an exemplary microwheel constructed in accordance with the teachings of the present invention.

Referring now to FIG. 3, an actuation and sensing pattern 50, as used in an exemplary microwheel constructed in accordance with the teachings of the present invention is schematically shown. An actuating and sensing pattern 50 includes lateral, vertical position control and stabilization actuators 34, capacitive position sensors 36, torque actuators for acceleration and energy transfer 38 and levitation actuators 40.

The actuator configuration allows for the stable motion control over at least 6 degrees of freedom, including acceleration and deceleration of the rotor to add/subtract energy/momentum to the microwheel. The position and movement of the microwheel is sensed by capacitive, and/or inductive and/or optical sensors to close the control loops. The package is evacuated to minimize the friction losses. The thickness and diameter of the rotor/stator can be tailored to match requirements for energy storage, momentum or both.

The microwheel enables novel modes of integration with walls of the satellite. The wheel fits any shape and size of a satellite since its diameter can be tailored between 1 and 8 inches and its thickness between approximately 1/25 and 3/25 inches. Other novel configurations include redundant arrays of wheels, wheel stacks that allow to cancel out the momentum when energy is added or subtracted. Stacking wheels may be employed to reduce the cost of stiffeners and packaging.

Again referring to FIG. 2, levitation and acceleration/deceleration are performed by magnetic and electric patterns on both the rotor (wheel) and the stator (package). Gaps 160a and 160b provide clearance between stators and rotor. In other embodiments the gap may be from about 5 to about 10 micrometers. The electrical current flowing in the conductor 166 generates the magnetic field. Relatively thick, e.g. 10 microns, electroplated magnetic material 164 will increase the magnetic forces between permalloy layers 168a, 168b and permalloy layers 164a, 164b, respectively. In other embodiments, the magnetic material may be different than permalloy. Losses are decreased by rotation in evacuated package and thick electroplated metal conductors. Electrical contacts extend from the edges of top and bottom wafers or are accessed by through the wafer vias. The drive electronics may be in one embodiment external waveform generators. Speed of the rotation may be controlled by pulse width or amplitude modulation of the current. The levitation and propulsion may be obtained by attractive force between stator and rotor parts of the actuator. The force becomes stronger as the rotor and stator move closer together. There is also a centering force present when magnet and conductor get misaligned (i.e. off-centered). Thus it is an inherently stable approach. The geometry and materials may be designed to reduce eddy current loses.

The power density of the micromachined silicon flywheel can be as high as 80 Whr/kg because electronics may be an integral part of the silicon package. When the flywheel is integrated with attitude control, it is believed that the effective power density will exceed any future battery capability. The additional advantage of the micro-flywheel is the very fast power discharging capability as compared to slow current drain from a battery. The high power/activity burst is an essential part of the logistic satellite mission.

Referring now to FIG. 4, another partial crossectional view of an exemplary microwheel as constructed in accordance with the teachings of the present invention shows a capacitive position sensor in detail. The capacitive sensor shown in FIG. 4 is made of two thin films of metal, such as gold, copper or another suitable metal, deposited on the stator. Metal films 181 and 182 form two capacitive plates. As the rotor 14a moves closer to the stator 12, the capacitance between electrode 181 and 183 increases because the distance to the intermediate electrode 182 deposited on the rotor decreases since the distance increases. The pattern of capacitive coupling shown in FIG. 3 allows independent detection of the distance between rotor and stator. Therefore, position sensing in three dimensions is possible. Other patterns of the electrodes can also detect the speed and direction of rotation of the rotor.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment and devices, and that various modifications, both as to the equipment details and operating procedures, may be accomplished without departing from the true spirit and scope of the present invention.

What is claimed is:

1. A microwheel comprising:

a top layer including a top layer base of silicon wafer material and having a first magnetic layer deposited on a surface of the base, the first magnetic layer having a first conductor deposited thereon;

a bottom layer, including a bottom layer base of silicon wafer material having a second magnetic layer deposited on a surface of the bottom layer base, the second magnetic layer having a second conductor deposited thereon, wherein the top layer and the bottom layer function as stators;

a middle layer including a rotor and a circular wall, around the rotor, juxtaposed between the top layer and the bottom layer, wherein the rotor includes a rotor base of silicon wafer material having a first rotor magnetic layer deposited on one side of the rotor base and having a second rotor magnetic layer deposited on an opposite side of the rotor base; and an actuation and sensing pattern coupled to the top layer, the bottom layer and the middle layer, the actuation and sensing pattern including an actuator configuration for motion control, including acceleration and deceleration of the rotor, the actuation and sensing pattern further including sensors for sensing position and movement and for closing control loops for energy storage, the actuation and sensing pattern further including lateral position control, vertical position control and stabilization actuators, capacitive position sensors, torque actuators for acceleration and energy transfer and levitation actuators.

2. A microwheel comprising:

a top layer including a top layer base of silicon wafer material and having a first magnetic layer deposited on a surface of the base, the first magnetic layer having a first conductor deposited thereon;

a bottom layer, including a bottom layer base of silicon wafer material having a second magnetic layer deposited on a surface of the bottom layer base, the second magnetic layer having a second conductor deposited thereon, wherein the top layer and the bottom layer function as stators, wherein the first magnetic layer comprises a recess wherein the first conductor is deposited and the second magnetic layer also comprises a recess wherein the second conductor is deposited;

a middle layer including a rotor and a circular wall, around the rotor, juxtaposed between the top layer and the bottom layer, wherein the rotor includes a rotor base of silicon wafer material having a first rotor magnetic layer deposited on one side of the rotor base and having a second rotor magnetic layer deposited on an opposite side of the rotor base; and an actuation and sensing pattern coupled to the top layer, the bottom layer and the middle layer, the actuation and sensing pattern including an actuator configuration for motion control, including acceleration and deceleration of the rotor, the actuation and sensing pattern further including sensors for sensing position and movement and for closing control loops for energy storage.

3. A multi-wheel system for momentum control in three axes comprising:

a first microwheel; and a second microwheel located to face one surface of the first microwheel and so as to rotate in opposition to the first microwheel when both are energized, wherein each microwheel includes, a top layer including a top layer base of silicon wafer material and having a first magnetic layer deposited on a surface of the base, the first magnetic layer having a first conductor deposited thereon, a bottom layer, including a bottom layer base of silicon wafer material having a second magnetic layer deposited on a surface of the bottom layer base, the second magnetic layer having a second conductor deposited thereon, wherein the top layer and the bottom layer function as stators, wherein the first magnetic layer comprises a recess wherein the first conductor is deposited and the second magnetic layer also comprises a recess wherein the second conductor is deposited, a middle layer including a rotor and a circular wall, around the rotor, juxtaposed between the top layer and the bottom layer, wherein the rotor includes a rotor base of silicon wafer material having a first rotor magnetic layer deposited on one side of the rotor base and having a second rotor magnetic layer deposited on an opposite side of the rotor base, and an actuation and sensing pattern coupled to the top layer, the bottom layer and the middle layer, the actuation and sensing pattern including an actuator configuration for motion control, including acceleration and deceleration of the rotor, the actuation and sensing pattern further including sensors for sensing position and movement and for closing control loops for momentum control in three axis.

4. The multi-wheel system of claim 3 wherein the actuation and sensing pattern comprises lateral position control, vertical position control and stabilization actuators.

5. The multi-wheel system of claim 4 wherein the actuation and sensing pattern comprises capacitive position sensors, torque actuators for acceleration and energy transfer and levitation actuators.

6. The multi-wheel system of claim 2 wherein the actuation and sensing pattern comprises lateral position control, vertical position control and stabilization actuators.

7. The multi-wheel system of claim 2 wherein the actuation and sensing pattern comprises capacitive position sensors, torque actuators for acceleration and energy transfer and levitation actuators.

* * * * *